Nov. 10, 1942. P. NICHOLAY 2,301,634
LOCK NUT
Filed Feb. 1, 1941
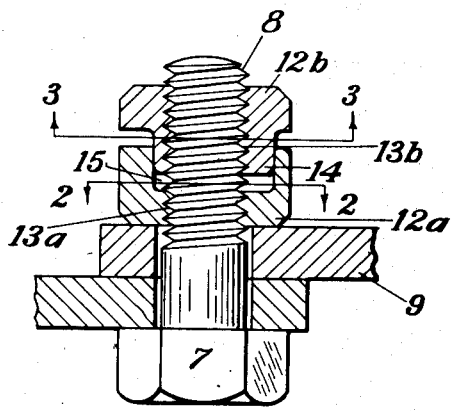
Fig.1
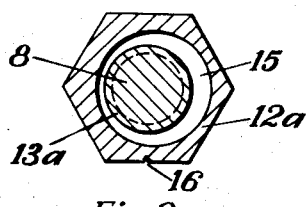
Fig.2
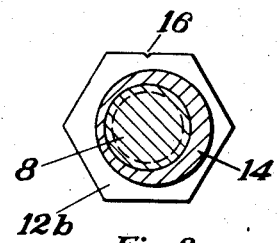
Fig.3
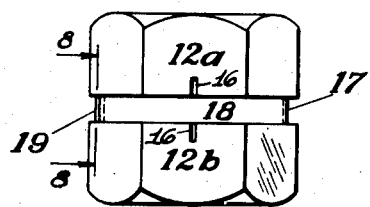
Fig.7
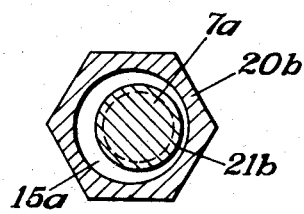
Fig.5
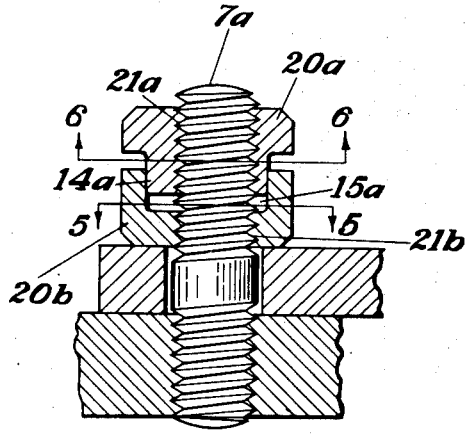
Fig.4
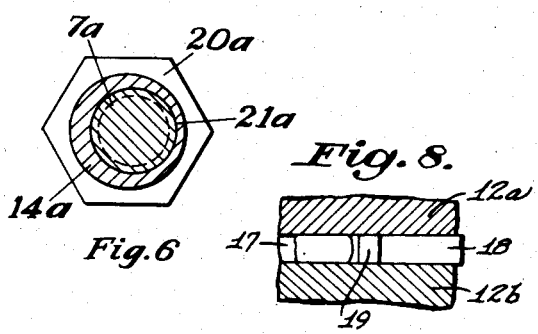
Fig.6
Fig.8.
INVENTOR.
PAUL NICHOLAY
BY
Rollandet, McGrew & Campbell
Attorneys.

Patented Nov. 10, 1942

2,301,634

UNITED STATES PATENT OFFICE 2,301,634

LOCK NUT

Paul Nicholay, San Francisco, Calif.

Application February 1, 1941, Serial No. 377,007

10 Claims. (Cl. 151—15)

This invention relates to lock nuts.

Various types of lock nuts have been in use for many years and in many fastening operations, some form of lock nut or the like is an essential. In the development of this art, many mechanical expedients have been devised in an attempt to provide a generally satisfactory lock.

In general, the devices available on the market consist of two nut members which are screwed onto a given bolt and moved along the same to the position at which the locking action is desired. Thereupon, by the continued movement of one relative to the other, a locking action is obtained and the forces applied in producing such locking action usually are directed lengthwise of the bolt and frequently result in loosening due to subsequent changes in said opposed forces.

Another locking arrangement in common usage involves the provision of a groove or recess in a nut adjoining its threaded bore and the insertion of an annular member of non-metallic material into the groove. With such an arrangement, the tightening of the nut will serve to cut a thread in the non-metallic material in the locking action which is calculated to provide sufficient friction to withstand ordinary loosening influences.

However, due to deterioration of the artificial thread as a result of usage and as a result of subsequent tightening actions and the like, such a lock often proves unsatisfactory during continued usage.

It is an object of the present invention to provide a simple and economical lock nut which is adapted for application to bolts and the like with conventional tools and which will provide a positive and durable lock at selective positions on the bolt.

Another object of the invention is to provide a simple and efficient lock nut which provides a positive lock and is adapted for repeated usage.

A further object of the invention is to provide a positive locking action in a lock nut by utilizing forces directed laterally of a bolt to which the lock nut is applied, rather than in a lengthwise direction therealong.

Other objects reside in novel details of construction and novel combinations and arrangements of parts, all of which will appear more fully in the course of the following description.

While the present invention involves novel principles which may be applied to a variety of structural forms, it will be described herein with special reference to two embodiments which illustrate the essential features and suggest the latitude of structural arrangement available within the spirit and scope of the invention.

To afford a better understanding of the invention, reference is made to the accompanying drawing, in the several views of which like parts have been designated similarly and in which:

Figure 1 is a vertical central section through a bolt to which a lock nut embodying features of the present invention has been applied;

Figure 2 is a section taken along the line 2—2, Figure 1;

Figure 3 is a section taken along the line 3—3, Figure 1;

Figure 4 is a vertical central section of a bolt to which a lock nut embodying the features of the invention in modified form has been applied;

Figure 5 is a section taken along the line 5—5, Figure 4;

Figure 6 is a section taken along the line 6—6, Figure 4;

Figure 7 is a side elevation of a lock nut assembly embodying features of the present invention, and drawn to an enlarged scale, and Figure 8 is a fragmentary, developed section along the line 8—8, Figure 7, and drawn to an enlarged scale.

In Figure 1, a headed bolt 7 provided with the usual threaded stem 8 is shown as extending through an object 9 to be locked.

The lock nut embodying features of the present invention is shown in threaded engagement with the stem 8 of bolt 7 and comprises two complementary nut members 12a and 12b, with the member 12a positioned on stem 8 in engagement with the object 9 which it fastens.

The threaded bores 13a and 13b of the members 12a and 12b respectively, are concentric with the lengthwise axes thereof. The member 12b is provided with a cylindrical skirt portion 14 which is disposed in eccentric relation to the lengthwise axis of member 12b.

The other complementary member 12a is provided with a cylindrical recess 15 which also is eccentric to its lengthwise axis and is of substantially the same diameter as skirt portion 14 of member 12b.

In moving the complementary members 12a and 12b along the threaded stem 8, they are initially positioned with their eccentric portions in coaxial relation and preferably the members 12a and 12b are in slightly spaced relation. When so positioned, they may be moved conjointly along the thread under the guidance of a suitable tool, such as a wrench, until they reach the position in which the locking action is desired.

It is then only necessary to rotate one of said members independently or differentially from the other and by so doing, the coaxial relation of the eccentric portions 14 and 15 is changed and binding forces of a linear character are applied in a direction transverse to the lengthwise axis of bolt 7. In this action, it is unnecessary to have the nut members in abutting relation to any other structure.

Because of the application of such forces, a positive locking is attained which serves to hold the nut members 12a and 12b as an integral unit against relative movement, even under extreme conditions of vibration, stress or temperature, until such time as the coaxial relationship of the eccentric portions is resumed by application of a suitable tool or the like.

While the locking action thus obtained is positive under all conditions, no damage to the threads of either the bolt 7 or complementary members 12a and 12b results, and because of this, the nut members are adapted for repeated usage.

In mounting the members 12a and 12b for conjoint movement along the thread of a bolt or the like, the coaxial relationship of the eccentric portions may be determined by the operator's sense of feeling, but as such lock nuts frequently are applied through the use of speed wrenches or machine tools, it is preferable to provide a visible means of determining the coaxial relationship.

This may be done in a variety of ways, but a simple expedient resides in the provision of alined markings on the members 12a and 12b which as illustrated in Figures 2 and 3 may comprise grooves 16 impressed on a face of the nut members, or by a rib or colored marking, as preferred. With such an arrangement, it is possible for the operator at a glance in selecting the given lock nut for application to determine the coaxial relationship, and if adjustment is required, it may be effected simply and quickly by relative rotation to bring the grooves 16 into alinement.

As a slight spacing between the members 12a and 12b is required during their conjoint movement in order to permit the necessary differential rotation to attain the locking action, an arrangement has been illustrated in Figure 7 which has the double function of determining the coaxial relationship and maintaining the desired degree of spacing.

In this form, the two members of the lock nut form a groove or recess as indicated by the dotted lines 17 in Figure 7, and a strip 18 of flexible material, preferably a metallic composition, is fitted into the groove and wound to contact the members and is folded outwardly as indicated at 19 to provide a projecting end. Preferably, this strip is lightly soldered in place or otherwise held on the lock nut against accidental displacement or removal.

After the nut members are applied to a bolt or the like and moved to the position where locking is desired, the operator pulls on the looped end 19 and removes the strip 18 which permits a turning movement of one of the members to obtain the desired locking action.

With such an arrangement, the coaxial relationship is determined prior to application of the strip 18 and consequently such strip functions both as a means of regulating the coaxial relationship and maintaining the desired spacing.

A modified form of the lock nut design has been shown in Figures 4, 5 and 6 as applied to a stud 7a rather than a bolt. In this form, the two complementary nut members 20a and 20b are provided with eccentric threaded bores 21a and 21b, respectively. The member 20a is provided with a cylindrical skirt portion 14a and the member 20b has a correspondingly contoured recess 15a to receive the skirt portion.

Both the skirt and recess portions 14a and 15a are concentric with the respective nut members. The nut members are adapted for conjoint movement along a thread to the selective position where the locking action is desired. By reason of the relation of the eccentric bores and concentric male and female portions, a differential or independent rotation of one of the nut members 20a or 20b serves to effect a binding engagement between the portions 14a and 15a through the application of laterally directed forces hereinbefore described.

From the foregoing, it will be apparent that so long as there is both a concentric and an eccentric relationship between component parts of the respective members, an independent or differential rotation of one will serve to change the axial relationship of the coacting parts of the respective members. By so doing, one part is moved into binding engagement with another, setting up opposed linear forces directed laterally of the lengthwise axis of the threaded member on which the lock nut is fastened.

The resulting locking action, while positive, produces no undue stress or distortion on the threaded surfaces and whenever the lock nut is removed by application of a suitable tool, the threads are undamaged and in condition for repeated usage.

It also will be apparent to persons skilled in the art, that the locking action attained in the present invention does not require any given nut member to be used as the abutment for the object to be held.

On the contrary, either member is equally effective for this purpose. Therefore, when the members are manufactured with their external surfaces of corresponding size, it is not necessary for the operator to exercise any selection in applying the nut members to a bolt or the like and so long as the coaxial and spacing relations previously described are maintained, such members may be moved easily to the required location and then by a differential movement can be effectively locked in place.

For purposes of clarity, the respective skirt and recess portions of Figures 1 and 4 have been illustrated in exaggerated sizes, but in actual usage, it will be preferable both from the standpoint of ease and cost of manufacture to have the depth of such portions only slightly in excess of the width of the thread, and by holding the clearance provided by the concentric-eccentric relation within narrow limits, only a fractional revolution will be required to attain the desired degree of locking.

While the invention has been described in a variety of forms which have proven effective for their intended purpose, it will be understood that other structural modifications employing the same mechanical principles may be utilized within the spirit and scope of the invention. Therefore, the forms described are intended to illustrate the broad scope of the invention, rather than to limit the same, and reference is made to the hereunto appended claims which measure the actual scope of the invention.

What I claim and desire to secure by Letters Patent is:

1. A device of the character described, comprising complementary members, means on said members for holding the same against relative movement during their conjoint movement along the thread of a bolt or the like, and means on one of said members disposed for movement relative to an adjoining surface of the other member in a lateral direction into binding engagement therewith by differential movement of one of said members.

2. A device of the character described, comprising complementary members, means on said members for holding the same against relative movement during their conjoint movement along the thread of a bolt or the like, and means on one of said members disposed for movement relative to an adjoining surface of the other member in a lateral direction into binding engagement therewith by independent movement of one of said members.

3. A device of the character described, comprising complementary members, means on said members for holding the same against relative movement during their conjoint movement along the thread of a bolt or the like, and eccentric means on one of said members disposed to move laterally relative to an adjoining surface of the other member into binding engagement therewith by differential movement of one of said members.

4. A device of the character described, comprising complementary members, means on said members for holding the same against relative movement during their conjoint movement along the thread of a bolt or the like, and cooperative means on the respective members disposed for binding engagement by the application of opposed forces directed laterally of the lengthwise axis of the bolt induced by differential movement of one of said members.

5. A device of the character described, comprising complementary members, means on said members for holding the same against relative movement during their conjoint movement along the thread of a bolt or the like, and cooperative means on the respective members disposed for binding engagement by the application of forces directed laterally of the bolt.

6. A device of the character described, comprising complementary members having concentric threaded bores for conjoint movement of the members along the thread of a bolt or the like, means on said members for holding the same against relative movement during said conjoint movement, there being male and female portions eccentrically positioned on the members in coaxial arrangement during said conjoint movement, and locking the members against relative movement when one is rotated independently of the other.

7. A device of the character described, comprising complementary members having eccentric threaded bores adapted to be positioned coaxially for conjoint movement of the members along the thread of a bolt or the like, means on said members for holding the same against relative movement during said conjoint movement, there being male and female portions concentrically positioned on the members in coaxial arrangement during said conjoint movement, and locking the members against relative movement when one is rotated independently of the other.

8. A device of the character described, comprising complementary members, means on said members for holding the same against relative movement during their conjoint movement in spaced relation along the thread of a bolt or the like, there being male and female portions eccentrically positioned on the members in coaxial arrangement during said movement and locking the members against relative movement when one is rotated independently of the other, and means for determining the coaxial and spacing arrangement of said members.

9. A device of the character described, comprising complementary members, means on said members for holding the same against relative movement during their conjoint movement along the thread of a bolt or the like, there being an eccentric recess in one of said members, and a correspondingly contoured skirt eccentrically disposed on the other of said members and positioned within said recess for binding engagement when one member is rotated independently of the other.

10. A device of the character described, comprising complementary members, means on said members for holding the same against relative movement during their conjoint movement along the thread of a bolt or the like, there being an eccentric recess in one of said members, a correspondingly contoured skirt eccentrically disposed on the other of said members and positioned within said recess in coaxial relation therewith for binding engagement when one member is rotated independently of the other, and means on the members for indicating the axial relationship of their eccentric portions.

PAUL NICHOLAY.